United States Patent [19]

Farmer, Jr.

[11] Patent Number: 5,052,737
[45] Date of Patent: Oct. 1, 1991

[54] ATTACHMENT STRUCTURE AND METHOD FOR SECURING A TOOLBOX ON A PICKUP TRUCK

[76] Inventor: Wilton T. Farmer, Jr., 6709 Rotherham Rd., Mechanicsville, Va. 23111

[21] Appl. No.: 512,450

[22] Filed: Apr. 23, 1990

[51] Int. Cl.⁵ ............................................. B62D 33/02
[52] U.S. Cl. ................................. 296/39.2; 224/42.42; 24/514
[58] Field of Search ...................... 296/37.6, 39.2, 167; 224/42.42, 42.45 R; 24/569, 514

[56] References Cited

U.S. PATENT DOCUMENTS

| | | | |
|---|---|---|---|
| 3,782,775 | 1/1974 | Weiler et al. | 224/42.45 X |
| 4,111,481 | 9/1978 | Nix et al. | 224/42.42 X |
| 4,249,684 | 2/1981 | Miller et al. | |
| 4,488,669 | 12/1984 | Waters . | |
| 4,522,326 | 6/1985 | Tuohy, III . | |
| 4,531,774 | 7/1985 | Whatley . | |
| 4,540,214 | 9/1985 | Wagner | 296/39.2 |
| 4,572,568 | 2/1986 | Kapp et al. | 296/39.2 |
| 4,580,827 | 4/1986 | Feagan . | |
| 4,595,229 | 6/1986 | Wagner | 296/39.2 |
| 4,623,187 | 11/1986 | Ibrahim . | |
| 4,635,992 | 1/1987 | Hamilton et al. . | |
| 4,659,133 | 4/1987 | Gower | 296/39.2 |
| 4,674,665 | 6/1987 | Van Kirk . | |
| 4,728,017 | 3/1988 | Mullican . | |
| 4,750,773 | 6/1988 | Chapline et al. . | |
| 4,796,942 | 1/1989 | Robinson et al. | 296/39.2 |
| 4,846,431 | 7/1989 | Pflieger | 24/514 X |
| 4,850,519 | 7/1989 | Farmer, Jr. | 224/42.42 |
| 4,850,633 | 7/1989 | Emery | 224/42.42 X |
| 4,901,963 | 2/1990 | Yoder | 24/514 X |
| 4,906,040 | 3/1990 | Edwards | 224/42.42 X |

Primary Examiner—Margaret A. Focarino
Assistant Examiner—Joseph D. Pape
Attorney, Agent, or Firm—Larson and Taylor

[57] ABSTRACT

An attachment structure for attaching to the side panels of a pickup truck a toolbox of the type having a lower part positioned within the bed of the pickup truck, a top part which is longer than the lower part and overhangs the side panels and a shelf interconnecting the lower and upper parts. The attachment structure secures the toolbox to the side panels without the need to drill holes into the tops of the side panels. A retainer plate is slidable through an end wall of the lower part of the toolbox between a retracted position mostly within the toolbox and an extended position mostly outside of the toolbox. A threaded bolt engages this retainer plate to urge it upwardly against an inner portion of the side panel which projects inwardly over the retainer plate.

9 Claims, 4 Drawing Sheets

ATTACHMENT STRUCTURE AND METHOD FOR SECURING A TOOLBOX ON A PICKUP TRUCK

FIELD OF THE INVENTION

This invention relates to toolboxes of the type which fit onto a pickup truck, and in particular it relates to improvements in securing this type of toolbox to the side panels of the pickup truck bed.

BACKGROUND OF THE INVENTION

It is well known to use, in pickup trucks and the like, rugged boxes which are generally mounted toward the front of the bed of the pickup truck and which extend completely across the pickup truck. These toolboxes include a lower part which extends down into the bed, but preferably not all the way down to the surface of the bed, and an upper part which is longer than the lower part, such that it extends onto the top of the side panels of the truck. Since the bottom of the lower part does not generally engage the surface of the bed, the full weight of the box generally rests on the tops of the side panels.

The usefulness of these boxes is virtually unlimited, and hence they are often referred to as "utility boxes". However, they are more commonly referred to as toolboxes; and accordingly in the present specification the term "toolbox" will be used generically, although it is understood that this term is applicable to a box of this type, regardless of its ultimate use.

Toolboxes of this type are described in several previous U.S. patents including the Applicant's prior U.S. Pat. No. 4,850,519. Other prior patents showing this type of toolbox include the Parker, et al U.S. Pat. No. 3,640,424, Grossman U.S. Pat. No. 4,288,011, Waters U.S. Pat. No. 4,488,669, Van Kirk U.S. Pat. No. 4,674,665 and Bonstead, et al U.S. Pat. No. 4,770,330. The toolboxes shown in all of these patents are of the type wherein a lower part fits down between the side panels and an upper part extends over the tops of the side panels. In some of these patents the lower part does not extend all the way down to the truck bed surface, such that the full weight of the toolbox rests on the tops of the side panels, while in other of these patents the lower part or an extension thereof does extend down to the surface of the bed such that at least a portion of the weight of the toolbox is received by the bed surface.

In use, these toolboxes are subjected to significant forces tending to dislodge them from their desired position as the pickup truck engages road bumps, turns at even reasonably high speeds, etc. Therefore, all toolboxes of this type, whether or not a portion of the load rests on the bed surface, must be securely attached to the pickup truck itself.

At present, the primary technique for securing toolboxes of this type to the pickup truck is to drill holes through the bottom of the upper part which is positioned over the top of the side panels and to drill matching holes through the top surface of the side panels themselves and then to use a suitable nut and bolt connection to positively secure the toolbox to the tops of the side panels. However, it will be apparent that this known technique is highly disadvantageous. If the pickup truck owner decides to subsequently remove the toolbox, he is left with unsightly holes in the tops of the side panels. Also, such holes provide exposed metal areas at which rust formation can be initiated.

Thus, a need exists for a new and improved arrangement for positively securing toolboxes of the present type to the pickup truck beds which overcomes the disadvantages of the known technique.

SUMMARY OF THE INVENTION

It is a purpose of the present invention to provide a new and improved attachment structure and method for positively securing a toolbox of the present type onto the side panels of a pickup truck which avoids the need to drill holes into these side panels.

This purpose is achieved, in accordance with the present invention, by providing an attachment structure which includes a first member operatively connected to the toolbox and extending outwardly from the lower part thereof, beneath an inwardly directed inner portion of the side panel, in combination with a second member which essentially squeezes this inner portion between the first member and the shelf which forms the bottom of the upper part where it extends beyond the lower part above the top of the side panel.

In accordance with a preferred arrangement, the first member may comprise a retainer plate which engages the bottom of this inner portion and the second member may comprise any connecting means such as a bolt and nut or the like for moving the retainer plate upwardly against the bottom of this inner portion, thereby securing the toolbox to the side panel by positively engaging this inner portion from above by the shelf of the upper part and from below by the retainer plate, wherein the shelf and retainer plate are forced towards each other to essentially squeeze this inner portion.

This attachment structure would be provided at both ends of the toolbox to cooperate with both side panels. At each end, one or more attachment structures may be provided. Preferably, the retainer plate of each of these attachment structures are mounted in and partially slidable through a slot in the end wall of the lower part. Preferably opposite ends of the retainer plate have a cross-section greater than the width of the slot so that the plate can slide through the slot substantially from end-to-end except that neither end can pass therethrough. Each retainer plate would preferably have one or more elongated slots extending in the direction from end-to-end, and the bolts would pass through these elongated slots, which bolts would then pass through the shelf of the upper part and be engaged from above by a nut. Thus, by simply tightening the nut the retainer plate would be pivoted upwardly, the pivot axis being the slot in the lower part end wall, to cause the above-described holding action against the inner portion of that side panel.

In a preferred arrangement, the toolbox would initially be manufactured with the attachment structure in place. The end user would then simply take the newly purchased toolbox, place it on the side panels of his pickup truck and manipulate the attachment structure to positively secure the toolbox to the pickup truck.

When the attachment structure is in fact mounted on and sold with a toolbox, it can advantageously be placed in a retracted position to minimize the portions thereof which are located outside of the toolbox. This is accomplished by sliding the retainer plate as far as possible into the slot with the bolts positioned in the elongated slots of the retainer plate at a point closest to the remote end of the plate and with the nuts tightened as much as possible so that in effect only a small portion of each retainer plate projects out of the slot in the end wall and even that small portion is turned upwardly towards the shelf as the nuts would have been tightened down to allow only the tops of the bolts to pass beneath the shelf.

The attachment structure of the present invention can then be brought into operation in a very simple manner. The operator would simply place the toolbox in place on the pickup truck. With the retainer plate in the retracted position, the toolbox will easily pass down between the inner portions of the side panels. Depending on the particular pickup truck construction, relative to the toolbox itself, there may be only a very slight clearance inside of the side panel so that if the retainer plates were not in the retracted position, they might hit the tops of the side panels rather than pass downwardly between the side panels.

After the toolbox has been placed on the tops of the side panels with the attachment structures having passed down between the side panels, the operator would then loosen the nuts to permit the retainer plates to pivot downwardly and then slide the retainer plates outwardly, beneath the said inner portions of the side panels. The operator would then simply tighten the nuts, pivoting the retainer plate back up against the bottom of said inner portions until said inner portions were positively and tightly engaged between the retainer plates and the shelves of the upper part. Utilizing this procedure, the toolbox is then very positively secured to the pickup truck side panels without the need for drilling any holes in the side panels.

Thus, it is an object of the present invention to provide a significantly improved attachment for securing a toolbox onto the side panels of a pickup truck which eliminates the need to drill any holes into the side panels.

It is another object of the present invention to provide a new and improved structure and method for securing a toolbox of the present type to the side panels of a pickup truck, wherein a portion of the side panels is positively engaged and squeezed between the shelf of the upper part of the toolbox and a first member of the attachment structure, wherein a second member effects this squeezing action.

It is still another object of the present invention to provide a new and improved arrangement for securing a toolbox to a pickup truck which includes a retainer plate attached to the end wall of the lower part of the toolbox which engages the bottom of an inner portion of the side panel in combination with a suitable means for moving this retainer plate upwardly against said inner portion, squeezing it between itself and the shelf of the top part of the toolbox.

It is still another object of the present invention to provide a new and improved method for installing an attachment structure for securing a toolbox of the present type to a pickup truck, wherein the attachment structure is moveable between a retracted position and an extended position, the retracted position being suitable for transport and storage and for initial placement of the toolbox onto the pickup truck, after which a retainer plate of the attachment structure is slid outwardly beneath an inner portion of the side panel and thereafter moved upwardly against the bottom of this inner portion to secure the toolbox relative to the side panels.

These and other objects of the present invention will become apparent from the detailed description to follow.

BRIEF DESCRIPTION OF THE DRAWINGS

There follows a detailed description of preferred embodiments of the present invention to be read together with the accompanying drawings wherein.

DETAILED DESCRIPTION OF THE PREFERRED EMBODIMENTS

Figure 1:
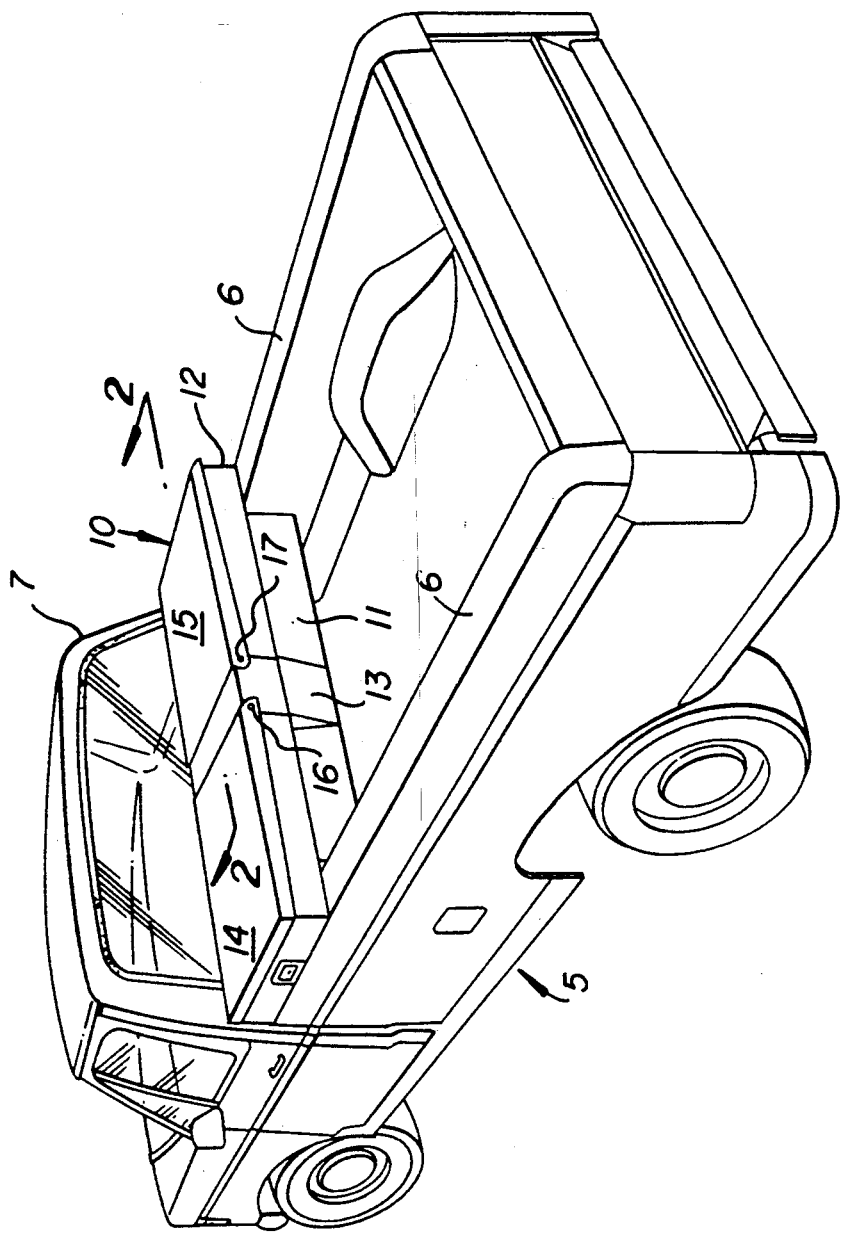
FIG. 1 is a perspective view of a pickup truck with a toolbox of the type which would be secured to the side panels thereof by the attachment structure of the present invention.

Referring now to the drawings, like elements are represented by like numerals throughout the several views.

Referring to FIG. 1, the present invention is especially adapted for securing a toolbox 10 in and on the bed of a pickup truck 5 and specifically, secured to the side panels 6 located behind the cabin 7 of the pickup truck. A toolbox of this type may include a centerpiece 13 and a pair of lids 14 and 15, each hinged to the body of the toolbox at hinges 16 and 17, respectively. The lids 14 and 15 are opened by pivotal movement about the axis of hinges 16 and 17. This type of toolbox 10 includes a lower part 11 adapted to fit down into the bed of the pickup truck, but preferably leaving a space between its bottom and the surface of the bed. This construction is preferable so that a space is provided beneath the toolbox 10 for placing into the bed, beneath the toolbox, long objects which might require the full length of the bed. Because this type of toolbox generally does not rest on the bed of the pickup truck, it includes an upper part 12 which is longer than the lower part, taken in the direction transverse to the pickup truck, wherein the extensions of the upper part 12 beyond the lower part 11 rest on the upper surfaces of the side panel 6.

While the weight of the toolbox 10 will generally assure some degree of stability, in order to positively prevent the toolbox from moving under extreme driving conditions such as riding over a bump, riding around a curve, etc., it is necessary to in some manner positively secure the toolbox to the pickup truck. Generally, this is done by drilling holes through the bottom of the overhanging portion of the upper part 12 and through the tops of the side panels 6 and extending bolts down through these openings, secured from beneath, thereby positively attaching the toolbox to the side panels 6. This disadvantages of this prior arrangement have been discussed above.

According to the present invention, means are provided for positively securing the toolbox 10 to the side panels 6 without the need to drill any holes in either the bottom of the overhanging portion of upper part 12 of the toolbox 10 or in the top of the side panel 6.

Figure 2:
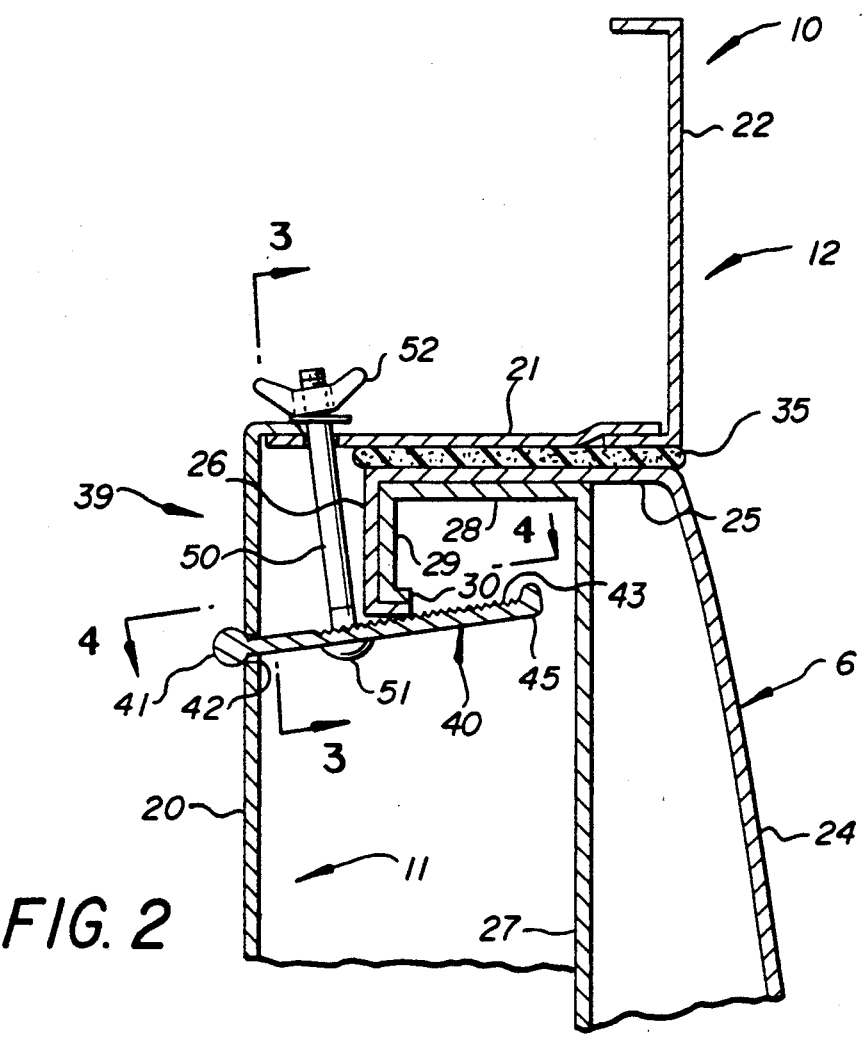
FIG. 2 is a partial cross-sectional view of the right hand end of the toolbox and its associated side panel of the pickup truck, taken in a vertical plane through the line 2—2 of FIG. 1.

FIG. 2 illustrates in greater detail the structure of a side panel 6. Generally the side panel is of hollow construction including an outer wall portion 24 which is continuous with a top wall portion 25 which is in turn integral with a downwardly turned vertical wall portion 26. The side panel 6 further includes an interior wall portion 27 which turns and is continuous with a top wall portion 28 which then turns downwardly to form the inside vertical wall portion 29. The ends of vertical wall portions 26 and 29 turn inwardly at adjacent ends 30. The wall portions to the left of wall portion 27 are defined herein as the "inner portion" of the side panel. Prior to the present invention, the toolbox would be secured by drilling an opening through the overhanging portion of the toolbox directly over the upper wall portions 25 and 28, and through these wall portions, extending a bolt or the like therethrough and reaching up from the space beneath the top wall portion 28 to secure the bolt in place. However, the present invention avoids the need for drilling such holes.

Referring to FIG. 2, there is shown in addition to the details of side panel 6 further details of this particular end of the toolbox 10. The end of the lower part 11 includes an end wall 20 while the end of the upper part 12 includes an end wall 22. The overhang between these two ends is shown in the form of a shelf 21.

Figure 3:
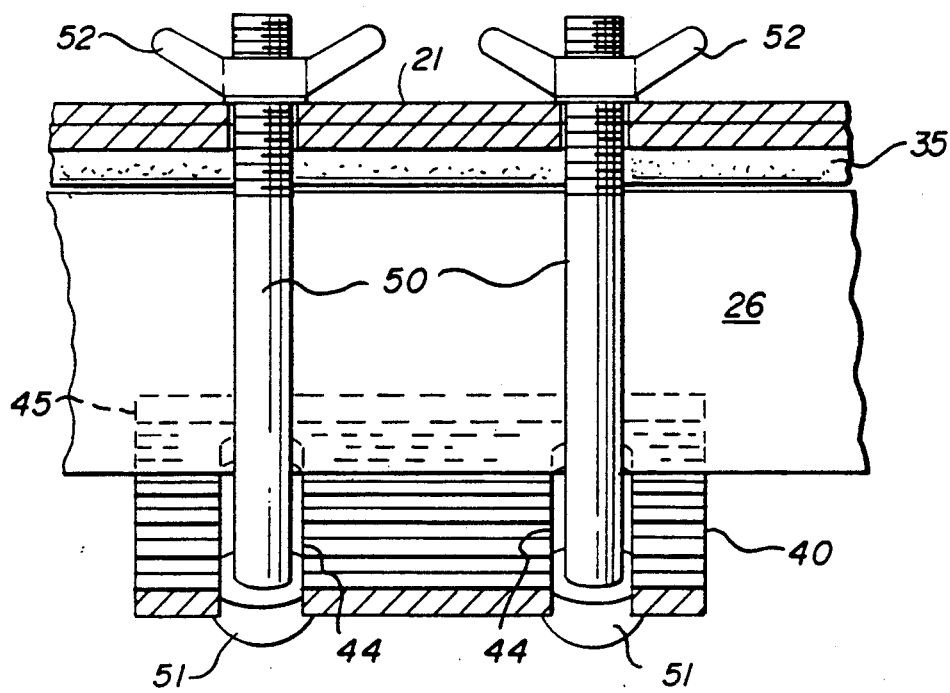
FIG. 3 is a cross-sectional view taken along line 3—3 of FIG. 2.
Figure 4:
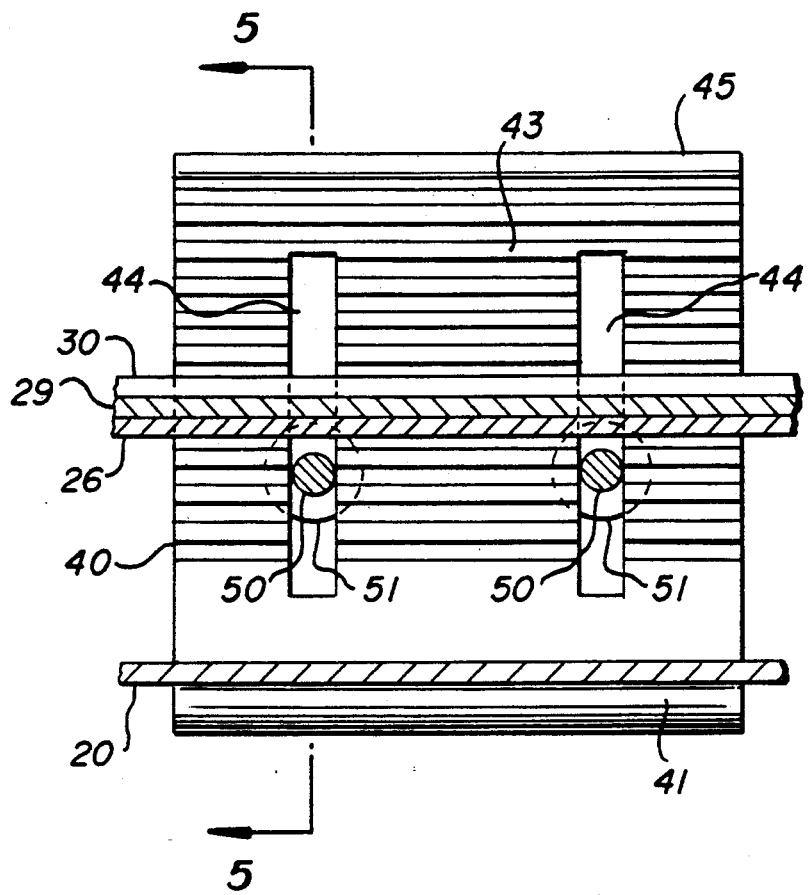
FIG. 4 is a cross-sectional view taken along line 4—4 of FIG. 3.
Figure 5:
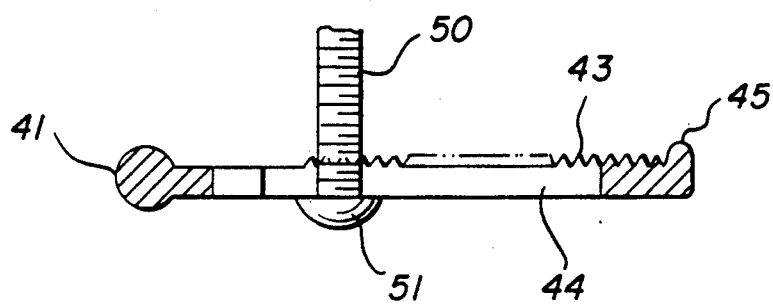
FIG. 5 is a cross-sectional view taken along line 5—5 of FIG. 4.

Referring now to FIG. 2 as well as FIGS. 3 through 5, the attachment structure 39 of the present invention is shown in its operative position firmly securing this end of the toolbox 10 to the right side panel 6.

The attachment structure includes a retainer plate 40 which in a preferred embodiment is generally rectangular. At its inner end it includes an enlarged cross-section bead 41 which preferably but not necessarily extends for the full length thereof. The end wall 20 includes a slot 42 having a length at least as great as the width of the retainer plate 40 and a width less than the cross-section of enlarged end 41. At its opposite end, the plate 40 has an enlarged cross-section remote end 45 which is also greater than the width of the slot 42. Between these two enlarged cross-sectional ends, the plate 40 is of a thickness less than the width of slot 42 so that the plate 40 can slide freely in said slot between the two enlarged cross-sectional ends 41 and 45.

As best shown in FIG. 4, the plate 40 includes a pair of elongated slots 44 and it preferably includes a serrated upper surface 43. For securing the toolbox 10 to the side panel 6, the plate 40 is so positioned that the enlarged end 41 is up against the edges of slot 42 and the serrated upper surface 43 is located beneath the inner portion of the side panel, urged against the turned in ends 30 of the wall portions 28 and 29, as this plate is urged upwardly by the tightening action of nuts 52 on a bolts 50 which pass through elongated slots 44, each bolt including a head 51 having a width greater than the width of its respective slot 44.

Preferably a cushion 35 is placed between the shelf 21 and the top wall portion 25 to prevent scraping of the latter.

The bolt is preferably a carriage bolt, and the nuts are preferably wing nuts. Preferably a washer is placed between the wing nut and the top surface of shelf 21.

Taking into account the spacial relationship between each end of a toolbox and the adjacent side panels of a pickup truck for which any given toolbox is applicable, a preferred retainer plate 40 would have the following dimensions. Its overall length, from the end 41 to the end 45 would be approximately three inches with each slot 44 approximately one and three quarter inches in length, each slot ending approximately one-half inch in from the remote end 45. The maximum thickness of enlarged cross-sectional end 45 would be approximately one quarter inch, the largest cross-section of end 41 would be approximately five sixteenth of an inch, and the thickness of the plate between these enlarged ends, excluding the serrations, would be approximately one eighth inch. The slot in the end wall 20 would of course be greater than one eighth of an inch but less than five sixteenth of an inch. Each plate would preferably be approximately three inches in width, each slot 44 being approximately one quarter inch in width, the slots being centered and spaced apart by approximately one and a quarter inches, leaving approximately five eighths of an inch between each slot and its closest side of the retainer plate.

Although the method of operation of the present invention will be apparent from the preceding discussion, for clarity, the method of operation will be discussed below in general terms, with respect to FIGS. 6A through 6C.

As the toolbox 10 is sold in commerce or as initially assembled, it is preferable to have the parts of the attachment structure already in place, but preferably in such a way that exposure of these parts exterior to the toolbox is held to a minimum. This can be accomplished in the manner shown in FIG. 6A. As shown therein the plate 40 is slid through the slot 42 and into the interior of the toolbox 10 for virtually its full length as the bolts 50 slide to the right in their slots 44. The nuts 52 are tightened down as far as possible so that the exposed portion of the retainer plate 40 is turned upwardly. The result, as shown in FIG. 6A, is that all of the parts of the attachment structure are in place on the toolbox and ready for immediate attachment to the side panel 6, but in a way such that the space which they take up on the exterior of the toolbox is minimized.

Figure 6A:
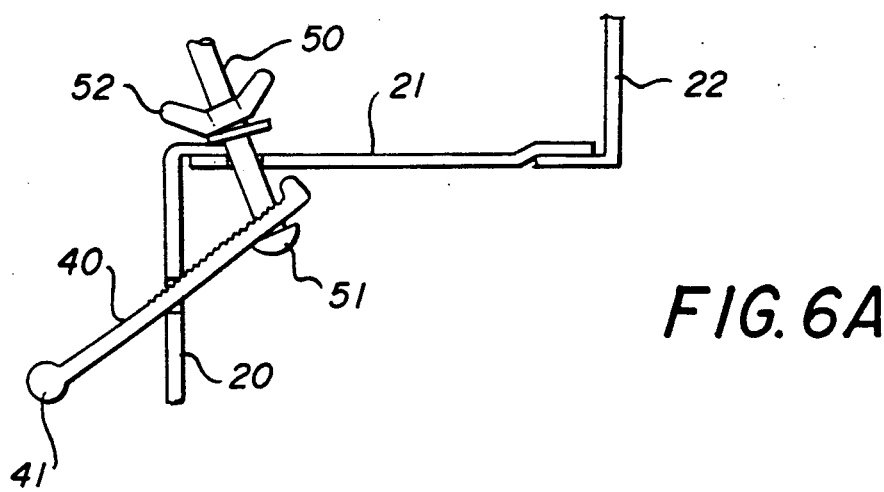
FIGS. 6A, 6B and 6C are schematic views similar to FIG. 2 but showing the different stages in the operation of the present invention.
Figure 6B:
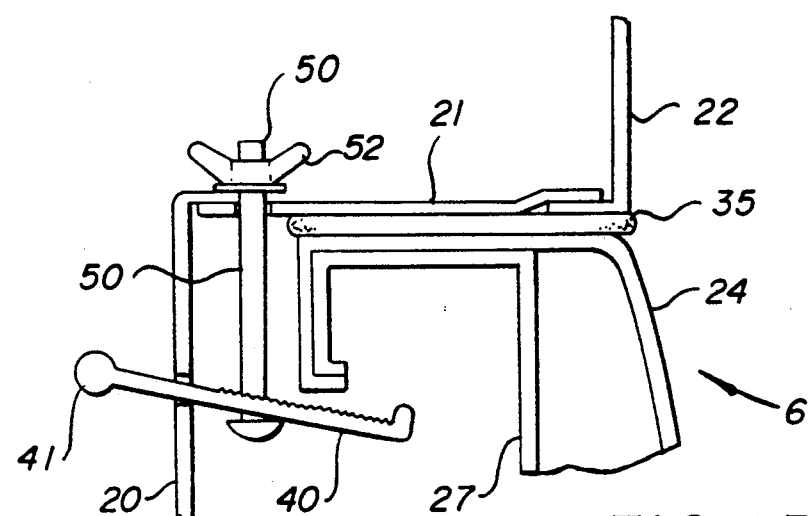

When the time then arrives for attaching the toolbox to the side panels 6, then with the elements as shown in FIG. 6A the toolbox is brought to the pickup truck and lowered into its final position. With the elements of the attachment structure as shown in FIG. 6A, these elements will not engage any portion of the side panels 6, especially the wall portions 25, 26, 28 and 29, during this lowering motion of the toolbox into its final position onto the side panels 6 of the pickup truck. Thereafter, the operator would turn the nuts 52 to lower the bolts as well as the right hand end of the plate 40 until its right hand end reached a level lower than turned in ends 30 of the side panel 6. The plate 40 would then be slid to the right, as the bolts 50 slid to the left of the elongated slots 44, to the position as shown in FIG. 6B. The nut 52 would then be tightened, pulling the plate 40 upwardly such that its upper end firmly engaged the turned in ends 30 of the side panel 6. As the nuts are further tightened, the point is reached where the frictional engagement between the upper surface of the plate 40 with the turned in ends 30 will be sufficient to secure the position of the toolbox 10 in the pickup truck for all normal anticipated movements of the pickup truck 10, for example for rides over bumps, around curves, etc. This frictional engagement can be enhanced by the upper serrated surface 43, although sufficient engagement can be achieved even by a plain upper surface of the retainer plate 44 in the absence of the serrated surface 43.

Figure 6C:
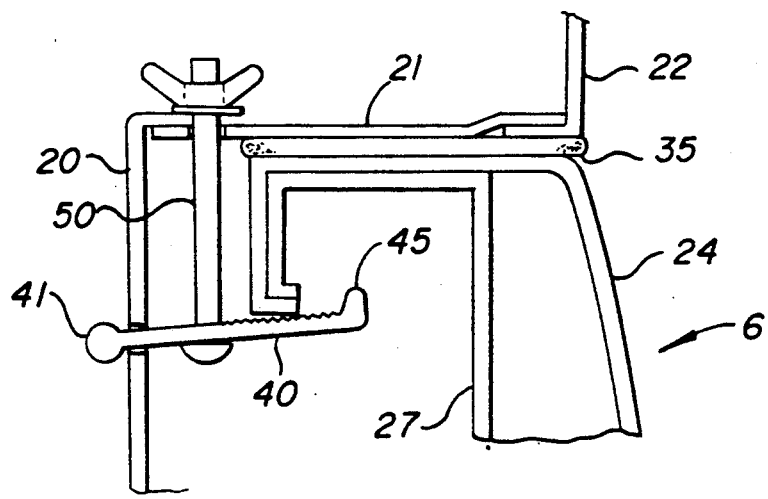

The fully tightened position of the attachment structure is shown in FIG. 6C which corresponds to FIG. 2.

Although only a single attachment structure is shown, it will be understood that a similar attachment structure would be provided at both ends of the toolbox 10. Also, although a single attachment structure at each end would generally be sufficient, it is of course possible to provide more than one attachment structure at either or both ends of the toolbox.

Although the invention has been described in considerable detail with respect to preferred embodiments thereof, it will be apparent that the invention is capable of numerous modifications and variations, apparent to those skilled in the art, without departing from the spirit and scope of the invention.

I claim:

1. In combination, a toolbox mountable on side panels of a pickup truck bed and an attachment means for securing the toolbox to the side panels, wherein the toolbox has a lower part of a first length, taken in a direction transversely across the pickup truck bed, which fits down between the side panels of the bed, a longer upper part which extends over the tops of the side panels of the pickup truck bed and a shelf extending from the top of the end of the lower part to the bottom of the end of the upper part, and wherein the side panels of the pickup truck each include an inner portion which projects inwardly from a main vertical wall portion of each side panel, said attachment means including a first member extending from inside of the toolbox out through the end of the lower part and beneath the said inner portion of the side panel, and a second member interconnecting the first member and said shelf and urging the first member against the bottom of the inner portion, squeezing the inner portion between the first member and the shelf, to secure the toolbox to the pickup truck bed.

2. The invention of claim 1, wherein the attachment means includes a plate having a first end located within the lower part of the toolbox and a second end located outside of the toolbox, beneath the said inner portion, and said second member urging the plate against the bottom of the inner portion.

3. The invention of claim 2, the second member including threaded bolt means which engage both the shelf and the plate to urge the plate toward the shelf.

4. The invention of claim 2, wherein said plate has at least one slot, elongated in a direction from the first end to the second end, the bolt engagable in the slot to permit varying the position of the bolt along the slot.

5. The invention of claim 4, wherein each plate has two parallel slots, each having a said bolt passing therethrough.

6. The invention of claim 2, the top surface of the plate being serrated to facilitate securely engaging the bottom of the inner portion.

7. The invention of claim 2, said attachment means being moveable between a retracted storage position in which the plate is substantially within the lower part of the toolbox and an extended operative position at which substantially all of the plate is located outside of the toolbox.

8. The invention of claim 7, the plate having elongated slots, elongated in the direction of movement of the plate between the retracted and extended positions, the second member engaging the plate through the slots, wherein the plate is moveable relative to the second member, between said positions.

9. The invention of claim 8, said second member being a threaded bolt means for each slot, said threaded bolt means engaging both the shelf and the plate to urge the plate toward the shelf, the bolt means being adjustable to hold the plate closer to the shelf in the retracted position and further from the shelf in the extended position.

* * * * *